(12) United States Patent
Kim et al.

(10) Patent No.: US 9,714,006 B2
(45) Date of Patent: Jul. 25, 2017

(54) WIPER BLADE

(71) Applicant: KBWS CORPORATION, Daegu (KR)

(72) Inventors: Kwan Hee Kim, Daegu (KR); Jae Hyuck An, Daegu (KR); Jin Wan Park, Daegu (KR)

(73) Assignee: KBWS Corporation, Daegu (KR)

( * ) Notice: Subject to any disclaimer, the term of this patent is extended or adjusted under 35 U.S.C. 154(b) by 337 days.

(21) Appl. No.: 14/060,855

(22) Filed: Oct. 23, 2013

(65) Prior Publication Data
US 2014/0115811 A1 May 1, 2014

(30) Foreign Application Priority Data
Oct. 26, 2012 (KR) .......................... 10-2012-0119468

(51) Int. Cl.
*B60S 1/38* (2006.01)
*B60S 1/40* (2006.01)

(52) U.S. Cl.
CPC .......... *B60S 1/3801* (2013.01); *B60S 1/3806* (2013.01); *B60S 2001/3815* (2013.01); *B60S 2001/408* (2013.01); *B60S 2001/4035* (2013.01)

(58) Field of Classification Search
CPC ............ B60S 1/3801; B60S 2001/3815; B60S 2001/4035
See application file for complete search history.

(56) References Cited

U.S. PATENT DOCUMENTS

| 4,118,825 A | * | 10/1978 | Hoebrechts | B60S 1/4003 |
| | | | | 15/250.32 |
| 5,361,896 A | * | 11/1994 | Yang | B60S 1/3801 |
| | | | | 206/223 |
| 7,921,504 B1 | | 4/2011 | Chiang | |
| 2005/0246852 A1 | * | 11/2005 | Shen | B60S 1/3801 |
| | | | | 15/250.201 |
| 2008/0313844 A1 | * | 12/2008 | Nacamuli | B60S 1/3801 |
| | | | | 15/250.351 |
| 2010/0083454 A1 | * | 4/2010 | Op't Roodt | B60S 1/3801 |
| | | | | 15/250.32 |

(Continued)

FOREIGN PATENT DOCUMENTS

| GB | 2064308 A | 6/1981 |
| JP | 1983-036748 A | 3/1983 |

(Continued)

OTHER PUBLICATIONS

KR1020110125035 (English translation), 2011.*

*Primary Examiner* — Andrew A Horton
(74) *Attorney, Agent, or Firm* — Fenwick & West LLP

(57) ABSTRACT

Disclosed is a wiper blade which includes a wiper strip 10 which wipes a wiping surface; and a lever unit 20 which supports the wiper strip 10. The lever unit 20 includes: a main lever 30 which is connected to a wiper arm; at least one pair of yoke levers 50 which supports wiper strip 10; and a pair of first auxiliary levers 40 which is relatively rotatably coupled to the yoke levers 50 respectively and is coupled to the main lever 30. Both ends of the main lever 30 include a coupling portion 33 in which a hinge recess 34 is formed. The first auxiliary lever 40 includes a hinge shaft 41 which is inserted and fixed to the hinge recess 34. The hinge shaft 41 has a tapered cross section in a longitudinal direction of the wiper blade 1.

16 Claims, 12 Drawing Sheets

(56) References Cited

U.S. PATENT DOCUMENTS

2011/0131750 A1* 6/2011 Kwon .................. B60S 1/3801
                                                15/250.31

FOREIGN PATENT DOCUMENTS

| | | |
|---|---|---|
| JP | 1995-013624 U | 3/1995 |
| JP | 07-028759 U | 5/1995 |
| JP | 2010-058676 A | 3/2010 |
| KR | 10-0865489 B1 | 10/2008 |
| KR | 20-0449008 Y1 | 6/2010 |
| KR | 10-2011-0125035 A | 11/2011 |
| WO | WO 2011/139014 A2 | 11/2011 |

\* cited by examiner

WIPER BLADE

BACKGROUND

1. Field

The present invention relates to a wiper blade, and more particularly to a wiper blade for a vehicle.

2. Description of Related Art

In general, a wiper blade removes impurities, snow, rain or the like when driving and prevents a driver's front sight from being deteriorated. A conventional wiper blade performs a repetitive reciprocating action in a fan shape as a motor drives a link apparatus connected to a wiper arm.

In a conventional wiper blade, a pair of metallic baking plates is coupled to a rubber-made wiper strip. The baking plate is supported by a plurality of yoke members. The yoke members are connected to each other by means of a plurality of levers.

Here, with regard to the conventional wiper blade, through use of a pin or a rivet, the yoke member and an auxiliary lever are rotatably coupled to each other, and auxiliary levers are rotatably coupled to each other. A spacer and the like which have a small friction coefficient is coupled to the coupling portion in order to reduce frictional resistance. Therefore, the number of parts constituting one wiper blade is as many as 20 and at least 15. Since the conventional wiper blade uses a metallic main lever and a metallic sub lever, the wiper blade is heavy.

The wiper blade which has a lot of parts and large weight gives a load to the wiper arm as well as a glass surface of the vehicle when the wiper blade is installed in the vehicle. As a result, breakdown may occur and the life span of the product may be shortened. Accordingly, a light wiper blade having an excellent assemblability is required to be developed.

SUMMARY

One embodiment is a wiper blade which includes a wiper strip which wipes a wiping surface; and a lever unit which supports the wiper strip. The lever unit includes: a main lever which is connected to a wiper arm; at least one pair of yoke levers which supports wiper strip; and a pair of first auxiliary levers which is relatively rotatably coupled to the yoke levers respectively and is coupled to the main lever. Both ends of the main lever include a coupling portion in which a hinge recess is formed. The first auxiliary lever includes a hinge shaft which is inserted and fixed to the hinge recess. The hinge shaft has a tapered cross section in a longitudinal direction of the wiper blade.

DETAILED DESCRIPTION

Figure 1:
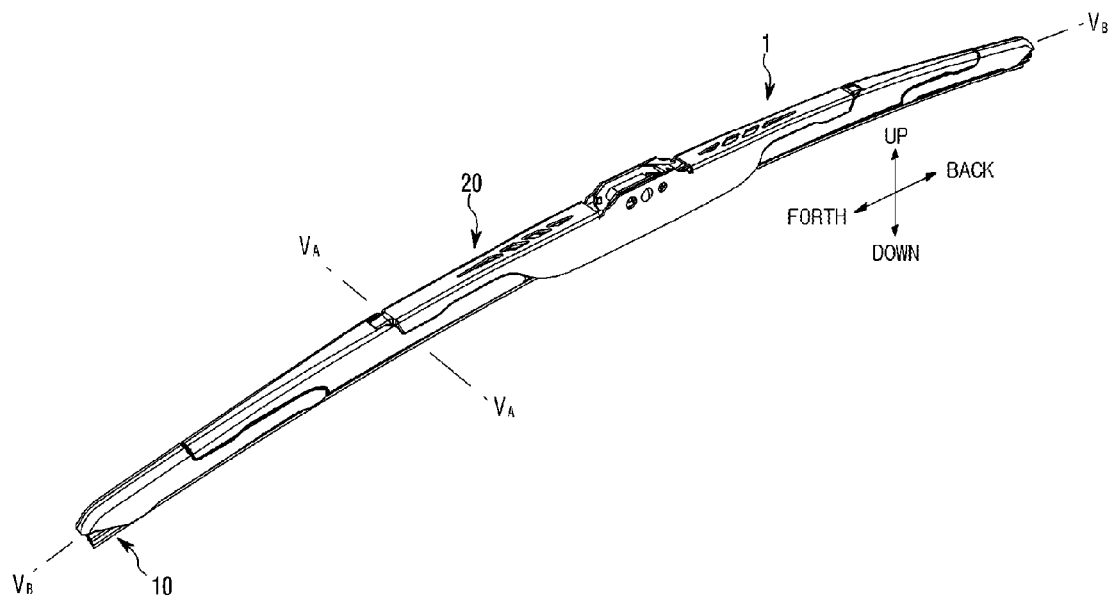
FIG. 1 is a perspective view showing an entire configuration of a wiper blade assembly according to an embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Figure 2:
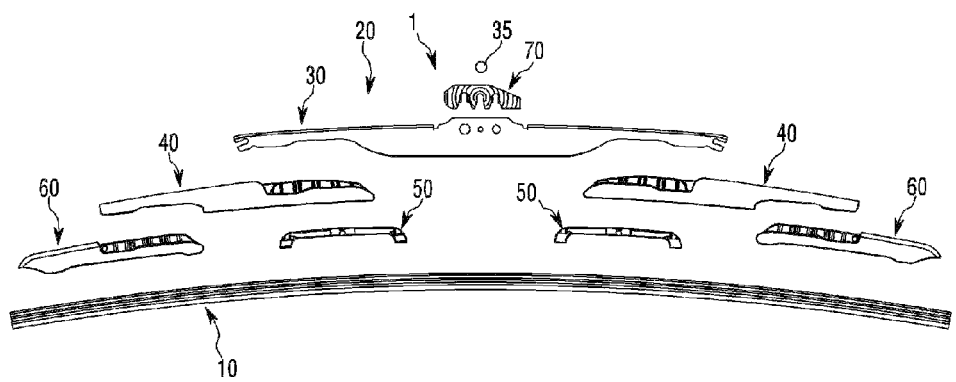
FIG. 2 is an exploded front view showing the wiper blade assembly according to the embodiment of the present invention.

An overall configuration of a wiper blade assembly according to the present invention FIGS. 1 and 2 are a perspective view and an exploded front view respectively which show a wiper blade assembly according to an embodiment of the present invention.

Referring to FIGS. 1 and 2, a wiper blade 1 according to the present invention includes a wiper strip 10 and a lever unit 20. The lever unit 20 may include a main lever 30, a pair of first auxiliary levers 40, a pair of yoke levers 50 and a pair of second auxiliary levers 60.

Hereafter, the wiper blade shown in FIGS. 1 and 2 will be described in detail.

The wiper blade 1 according to an embodiment of the present invention is connected to a front end of a wiper arm (not shown) and receives a pressing force from the wiper arm in a direction of a glass surface of a vehicle. The wiper arm rotates reciprocatively at a predetermined angle by a wiper motor (not shown). Accordingly, the wiper blade 1 wipes the glass surface (wiping surface) of the vehicle within the predetermined angle.

Figure 3A:
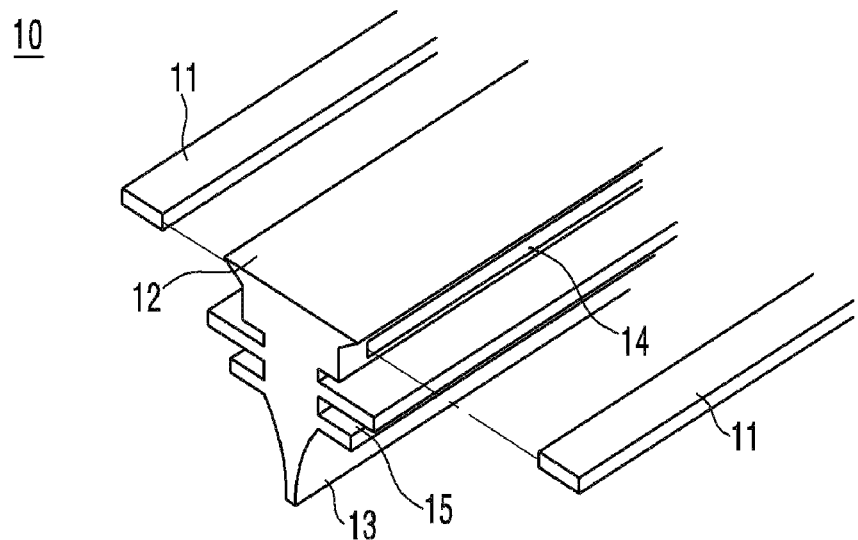
FIG. 3a is a perspective view showing one end of a wiper strip according to the embodiment of the present invention.
Figure 3B:
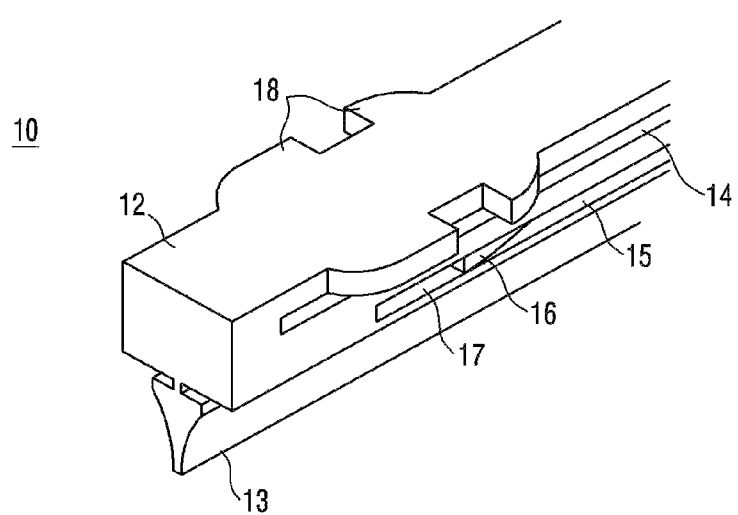
FIG. 3b is a perspective view showing the other end of the wiper strip according to the embodiment of the present invention.

FIGS. 3a and 3b are partial perspective views showing respectively one end and the other end of the wiper strip 10.

As shown in FIGS. 1, 2, 3a and 3b, the wiper blade 1 may further include two baking plates 11 mounted on the wiper strip 10.

Referring to FIGS. 1, 2, 3a and 3b, the wiper strip 10 includes a wiping lip 13 and a base 12. The wiping lip 13 contacts directly with and wipes the glass surface. The base 12 is supported by the yoke lever 50 and the second auxiliary lever 60. The wiper strip 10 is disposed to contact with the glass surface of the vehicle in a sliding manner and removes impurities on the glass surface. The wiper strip 10 extends in a longitudinal direction thereof and is made of either an elastic material like rubber or an elastic composite material.

The base 12 is supported by fasteners of the yoke lever 50 and the second auxiliary lever 60. The fasteners may have a yoke shape. The base 12 and the wiping lip 13 continuously extend in a longitudinal direction of the wiper strip 10. A receiving recess 14 in which the two parallel baking plates 11 may be received extends in the base 12 in a longitudinal direction thereof. The two rectangular metallic baking plates 11 having spring characteristics are received in the two baking plate receiving recesses 14 respectively. A holding portion 15 receives the fastener in a sliding manner.

As shown in FIG. 3a, the holding portion 15 located at the one end of the wiper strip 10 is open so as to receive the fastener. However, as shown in FIG. 3b, the other end of the wiper strip is formed to limit the longitudinal direction movement of the fastener. That is, the fastener supporting the other end of the wiper blade 1 among the fasteners of the second auxiliary lever 60 is limited by a coupler 17 and a wall of a slope 16 provided only at the other end of the holding portion 15. Also, the longitudinal direction movement of the fastener is limited by a protrusion 18.

The baking plate 11 applies elasticity and rigidity to the wiping lip 13. When a pressing force is applied from the wiper arm, the pressing force is distributed to the wiper strip 10 through the levers. Here, the pressing force is distributed by the baking plate 11 in the longitudinal direction of the wiper strip 10. Accordingly, the baking plate 11 should have elasticity and rigidity to maintain the shape of the wiper strip 10. A plurality of the baking plates 11 and a plurality of the baking plate receiving recesses 14 may be provided according to the rigidity or elasticity of the wiper strip.

Next, an embodiment of the wiper blade according to the present invention will be described.

An Embodiment of the Wiper Blade According to the Present Invention

First Embodiment

Figure 4:
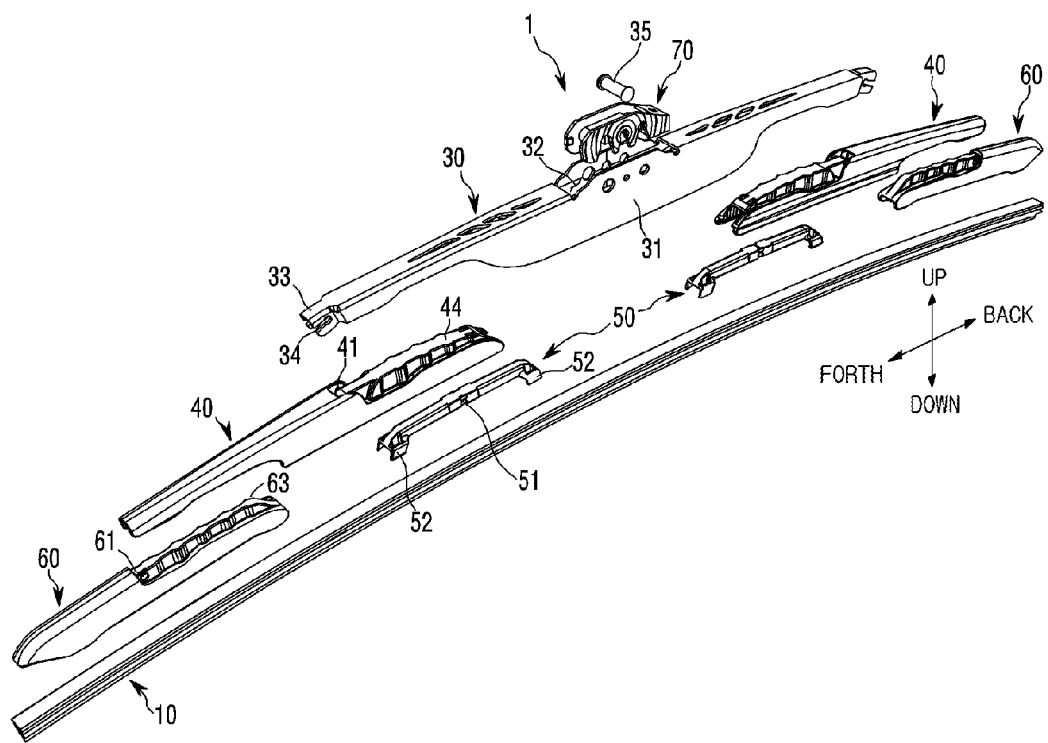
FIG. 4 is an exploded perspective view showing the wiper strip according to the embodiment of the present invention.

FIG. 4 is an exploded perspective view showing the wiper strip according to a first embodiment of the present invention.

Referring to FIG. 4, in the lever unit 20, a plurality of levers are mutually rotatably coupled within a range of a certain angle with respect to a particular axis of rotation. In the embodiment, the lever unit 20 may include the main lever 30, a pair of the first auxiliary levers 40, a pair of the yoke levers 50 and a pair of the second auxiliary levers 60. The levers are pivotably coupled to each other in accordance with the shape of the lever itself within a range of a certain angle.

The main lever 30 is directly connected to the wiper arm (not shown) and receives a pressing force from the wiper arm. A spoiler 31 may be integrally formed with the main lever 30. The spoiler 31 is formed by changing the shape of the side of the main lever 30, toward which traveling wind flows. When wiping is performed, the spoiler 31 induces the air such that air flowing toward the glass of the vehicle presses the main lever 30 in a direction closer to the glass of the vehicle. Accordingly, the main lever 30 presses the wiper strip toward the glass in such a manner that the wiper strip 10 traces a curvature of the glass of the vehicle and slidably comes into contact with the glass.

Figure 5:
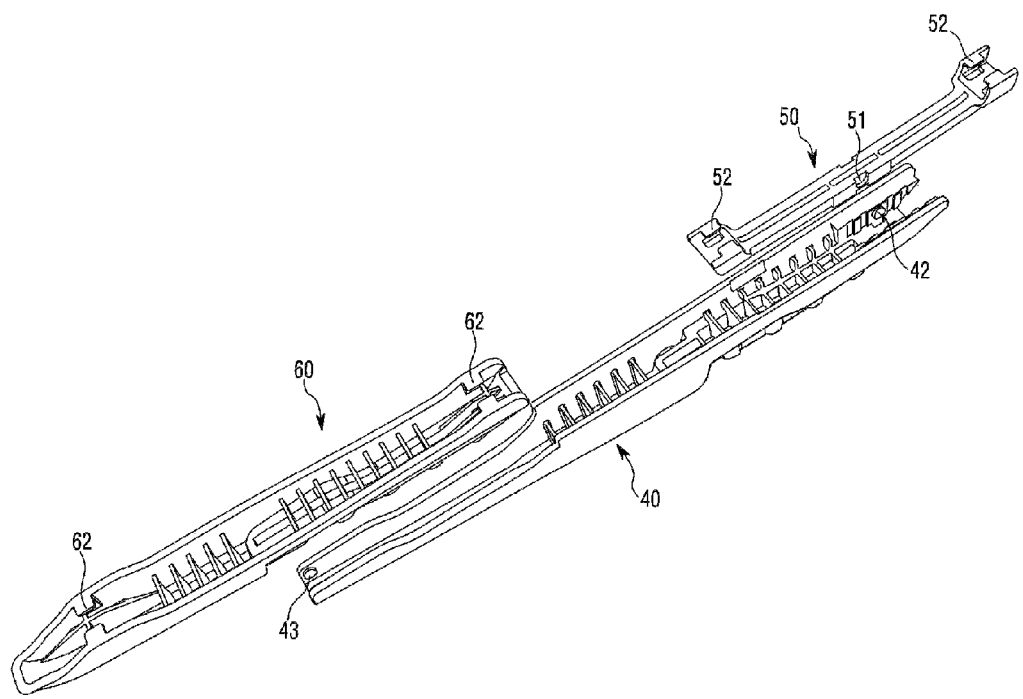
FIG. 5 is a bottom perspective view showing a first auxiliary lever, a yoke lever and a second auxiliary lever of the wiper blade according to the embodiment of the present invention.

FIG. 5 is a bottom perspective view showing the first auxiliary lever 40, the yoke lever 50 and the second auxiliary lever 60 of the wiper blade according to the embodiment of the present invention.

Referring to FIG. 5, the first auxiliary lever 40 is coupled to the yoke lever 50 and the second auxiliary lever 60.

As shown in FIGS. 4 and 5, the yoke lever 50 presses the wiper strip 10 and supports the wiper strip 10 in such a manner as to be slidable. Both ends of the yoke lever 50 include yoke-shaped fasteners 52 and support the wiper strip 10. The yoke lever 50 is disposed closer to the center from the end of the wiper strip 10. A catching recess 51 is formed near the center of the yoke lever 50 and is concave in the width direction of the yoke lever 50. A first catching protrusion 42 of the first auxiliary lever 40 is caught by and coupled to the catching recess 51. A portion of the yoke lever 50 may be received in the lower portion of the first auxiliary lever 40. The rest portion of the yoke lever 50, which is not received in the first auxiliary lever 40, may be received in the lower portion of the main lever 30 to be described below. Therefore, when the wiper blade 1 does not perform wiping operation, the yoke lever 50 is not visible from the outside, so that the appearance is improved. Meanwhile, the yoke lever 50 is made of a resin material and may be manufactured by an injection molding method.

The second auxiliary lever 60 supports the wiper strip 10 in such a manner as to be slidable. Both ends of the second auxiliary lever 60 include fasteners 62 and support the wiper strip 10. The second auxiliary lever 60 is made of a resin material and may be manufactured by the injection molding method. A fastener located at the front end of the wiper blade 1 among the fasteners 62 of the second auxiliary lever 60 supports one end of the wiper strip 10. Also, the second auxiliary lever 60 may receive therewithin a portion of the wiper strip 10. The second auxiliary lever 60 supports a portion other than the portion of the wiper strip 10, which is supported by the yoke lever 50. The second auxiliary lever 60 forms the appearance of the wiper blade 1.

As shown in FIGS. 4 and 5, a catching recess 61 to which a second catching protrusion 43 of the first auxiliary lever 40 is coupled is formed near the center of the second auxiliary lever 60. The catching recess 61 is formed concave in the width direction of the second auxiliary lever 60. A portion of the second auxiliary lever 60 is received in the lower portion of the first auxiliary lever 40. Here, a prominence and depression structure 63 may be formed on the upper surface of the second auxiliary lever 60 which is received in the first auxiliary lever 40 and then contacts with the lower portion of the first auxiliary lever 40. Since the first auxiliary lever 40 and the second auxiliary lever 60 are manufactured by the injection molding method, there may occur an error between the size of the each lever and a design value during the manufacturing process thereof. That is, the each lever may be manufactured to have a size that is larger or smaller than the design value. If the width of the first auxiliary lever 40 is greater than the design value or the width of the second auxiliary lever 60 is less than the design value, there occurs a gap between the two levers 40 and 60, so that they may be vulnerable to a bending moment when wiping is performed, and the lifespan of the wiper blade 1 may be shortened. Contrary to this, if the width of the first auxiliary lever 40 is less than the design value or the width of the second auxiliary lever 60 is greater than the design value, the first auxiliary lever 40 excessively presses the second auxiliary lever 60. Accordingly, the first auxiliary lever 40 and the second auxiliary lever 60 do not easily pivot together when wiping is performed, and thus a wiping performance may be degraded.

As shown in FIGS. 4 and 5, in the wiper blade 1 according to the embodiment, the prominence and depression structure 63 may be formed on the portion where the two levers contact with each other. In a plurality of the prominences and depressions of the prominence and depression structure 63 formed on the second auxiliary lever, it is recommended that the width of the prominence projecting from the both sides thereof should be formed such that the prominence contacts with the inner surface of the first auxiliary lever 40. However, the widths the prominence and depression of the prominence and depression structure 63 may be formed differently from the design value in the manufacturing process. That is, the width of the prominence of each of the prominences and depressions may be greater or less than the design value. Among the prominences and depressions of the prominence and depression structure 63, a prominence having a width greater than the design value and the biggest difference between the width of the prominence and the design value comes in contact with the inner surface of the first auxiliary lever 40. Therefore, although the width of a particular prominence of the prominence and depression structure 63 is formed to be greater than the design value, it is possible to prevent the entire second auxiliary lever 60 received in the first auxiliary lever 40 from being excessively pressed because the first auxiliary lever 40 partly presses the prominence and depression structure 63. Accordingly, the two levers 40 and 60 can be easily pivoted with respect to each other. In the meantime, when the width of at least one prominence of the prominence and depression structure 63 is greater than the design value, the first auxiliary lever 40 and the second auxiliary lever 60 come in contact with each other, so that the gap between the two levers 40 and 60 can be prevented from being created.

In other words, the prominence and depression structure 63 of the second auxiliary lever 60 provides the contact portion between the two levers when wiping is performed, so that the gap is prevented from being created and the wiping can be easily performed.

The main lever 30 is coupled to the approximate center of the first auxiliary lever 40. Both ends of the first auxiliary lever 40 are coupled to the yoke lever 50 and the second auxiliary lever 60 respectively. Also, the lower inside of the first auxiliary lever 40 receives a portion of the yoke lever 50 and a portion of the second auxiliary lever 60.

As shown in FIGS. 4 and 5, the first auxiliary lever 40 includes a hinge shaft 41 coupled to a hinge recess 34 formed on both ends of the main lever 30, the first catching protrusion 42 coupled to the catching recess 51 of the yoke lever 50, and the second catching protrusion 43 coupled to the catching recess 61 of the second auxiliary lever 60.

Figure 6:
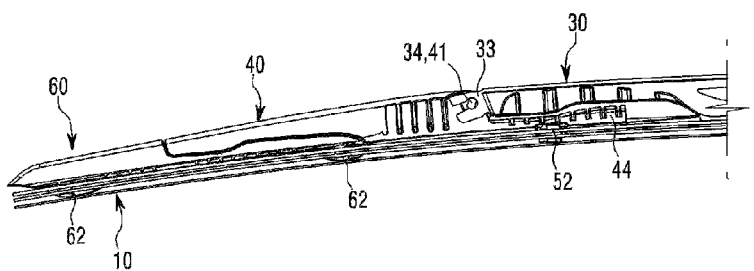
FIG. 6 is a cross-sectional view of FIG. 1 taken along line VB.
Figure 7A:
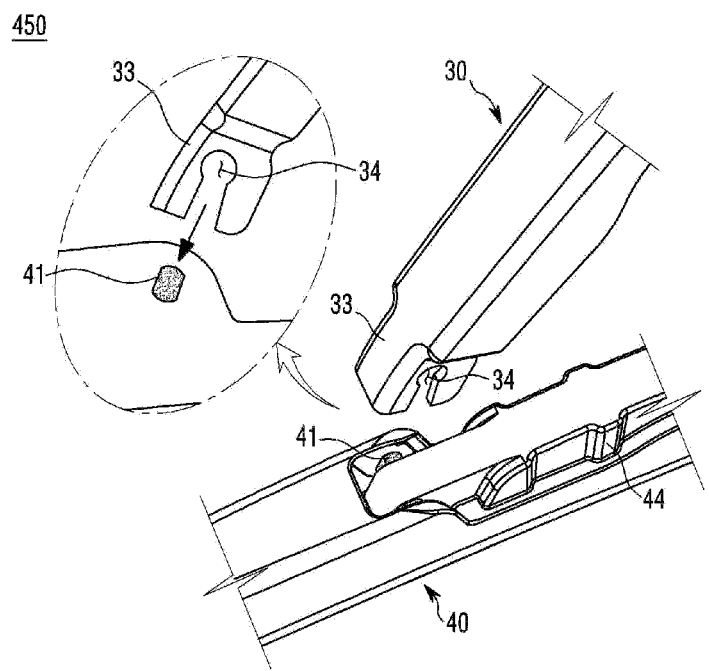
FIGS. 7a to 7c are perspective views showing a hinge shaft of a first auxiliary lever and a hinge recess of a main lever in the wiper blade according to the embodiment of the present invention.
Figure 7B:
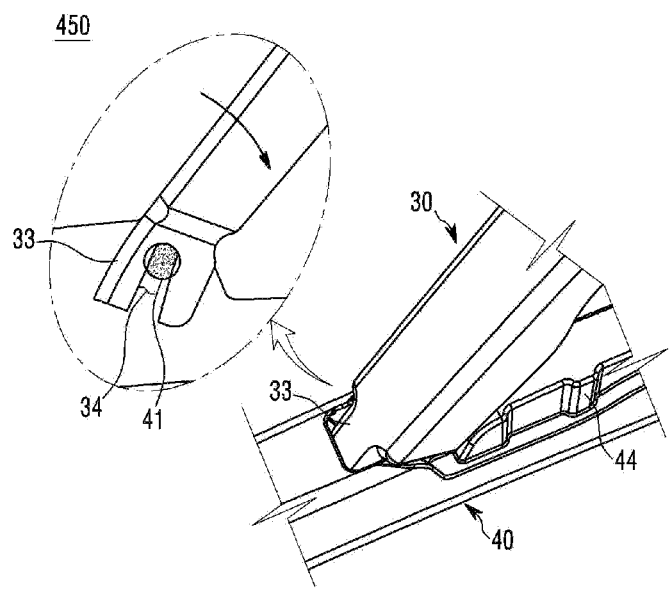
Figure 7C:
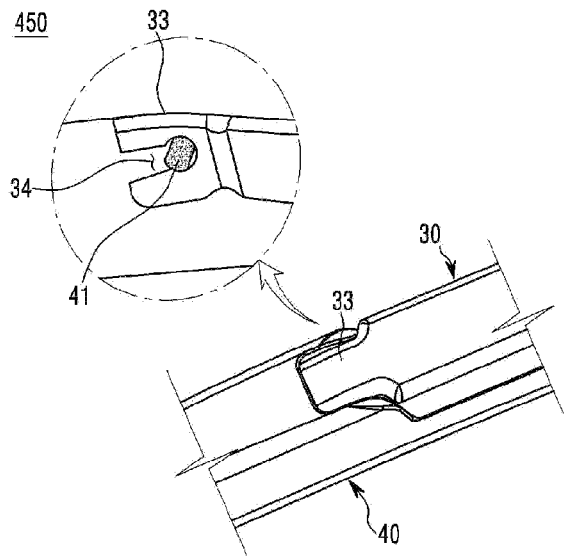

FIG. 6 shows a portion of the longitudinal cross section of FIG. 1 taken along line VB. FIGS. 7a to 7c show in detail the cross section of the hinge shaft 41 of the first auxiliary lever 40.

As shown in FIGS. 4 to 7c, the hinge shaft 41 is inserted and fixed to the below-described hinge recess 34 of the main lever 30, and then functions as an axis of the relative rotation of the two levers. The cross section formed by cutting the hinge shaft 41 in the longitudinal direction thereof has a non-circular shape. The non-circular cross section of the hinge shaft 41 has an outer circumference tapered in a direction in which the first auxiliary lever 40 is coupled. The hinge shaft 41 is inserted through a circular opening of the hinge recess 34, and then couples the first auxiliary lever 40 and the main lever 30. The tapered cross section of the hinge shaft 41 is formed such that a gap between the hinge shaft 41 and the opening of the hinge recess 34 becomes smaller toward the rear end from the front end of the hinge shaft 41 in the direction in which the hinge shaft 41 is inserted into the circular opening of the hinge recess 34. In other words, in FIG. 7a, the width of the front end of the hinge shaft 41, in the direction in which the hinge shaft 41 is inserted into the hinge recess 34, is less than the width of the opening of the hinge recess 34. Meanwhile, in FIG. 7b, after the hinge shaft 41 is inserted and fixed to the hinge recess 34, the width of the rear end of the hinge shaft 41, which is located in the opening of the hinge recess 34, may be substantially equal to or slightly greater than that of the opening. As shown in FIG. 7c, when the first auxiliary lever 40 and the main lever 30 are aligned with each other by the rotary coupling, the hinge shaft 41 having the tapered structure causes the first auxiliary lever 40 not to be easily separated from the main lever 30. The coupling structure between the first auxiliary lever 40 and the main lever 30 will be described in detail later.

As shown in FIGS. 4 to 7c, the first catching protrusion 42 is caught by being elastically received in the catching recess 51 of the yoke lever 50. The second catching protrusion 43 is caught by being elastically received in the catching recess 61 of the second auxiliary lever 60. The first auxiliary lever 40, the yoke lever 50 and the second auxiliary lever 60 may be all formed of a resin material by using the injection molding method. Therefore, since the three levers 40, 50 and 60 are formed of the resin material, they are coupled to each other without using a conventional method of forming a through-hole and inserting a metallic pin or rivet into the through-hole. That is, according to the embodiment of the present invention, the protrusion and recess are formed on the wiper blade 1, and then the protrusion is coupled to the recess through use of a catching method using the elasticity of the resin material. Accordingly, the number of the parts constituting the wiper blade 1 can be reduced and the weight of the entire wiper blade 1 can be also reduced.

Meanwhile, the portion of the first auxiliary lever 40, which contacts with the main lever 30, may have a prominence and depression structure 44. Since the first auxiliary lever 40 is manufactured by the injection molding method, there may occur a minute error between the actual size and the design size in the manufacturing process. The prominence and depression structure 44 of the first auxiliary lever 40 may contact with at least one portion of the inner surface of the main lever 30. Hence, the prominence and depression structure 44 provides the contact portion between the two levers when wiping is performed, so that the gap between the two levers can be prevented from being increased.

Figure 8:
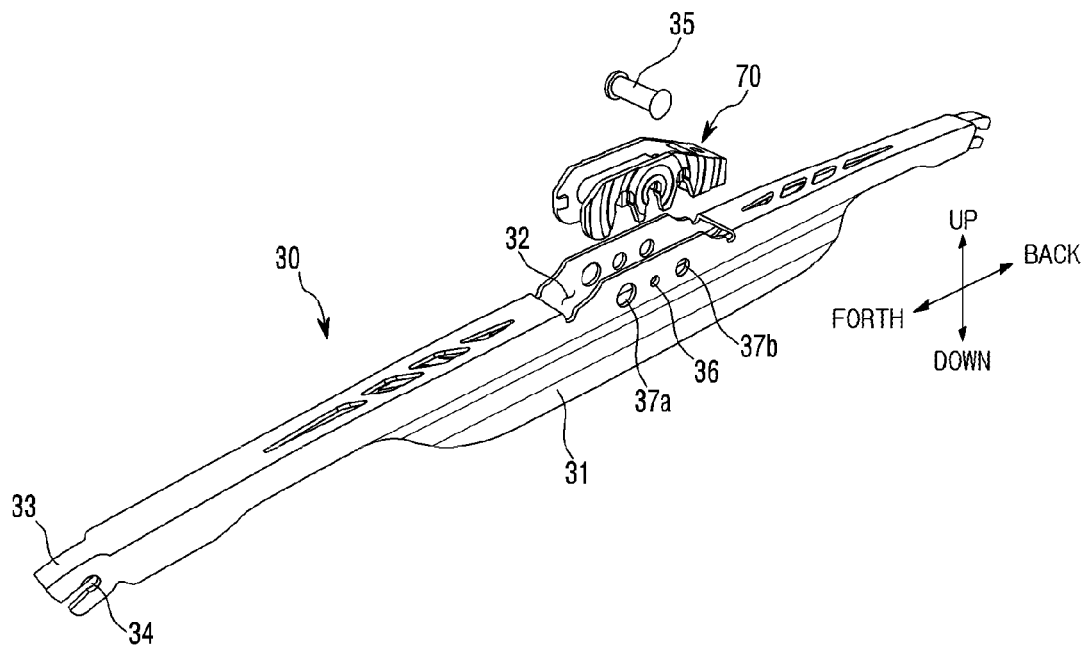
FIG. 8 is a perspective view showing the main lever of the wiper blade according to the present invention.

FIG. 8 is a perspective view showing the main lever of the wiper blade according to the embodiment of the present invention.

Referring to FIG. 8, the main lever 30 includes the spoiler 31, a coupling hole 32, a coupling portion 33, the hinge recess 34 and a central shaft 35. The main lever 30 is directly connected to the wiper arm (not shown) and receives a pressing force from the wiper arm, and then transmits the pressing force to the first auxiliary lever 40. The main lever 30 is coupled to the first auxiliary lever 40. The lower inside of the main lever 30 receives a portion of the first auxiliary lever 40 and a portion of the yoke lever 50.

As shown in FIG. 8, the spoiler 31 is provided in the main lever 30 in the direction in which the traveling wind flows when driving. When wiping is performed, the spoiler 31 induces the air such that air flowing toward the glass of the vehicle presses the main lever 30 in a direction closer to the glass of the vehicle. Though FIG. 8 shows that the spoiler 31 is integrally formed with the side of the main lever 30, the position where the spoiler 31 is formed is not limited. That is, the spoiler 31 may be implemented according to the change of the shape of the upper surface or side of the main lever 30.

The coupling hole 32 is formed in the longitudinal central portion of the wiper blade 1. The wiper arm (not shown) is inserted and fixed to the coupling hole 32.

The central shaft 35 is provided in the coupling hole 32 and traverses the coupling hole 32 in the width direction of the coupling hole 32. An adaptor 70 which is directly connected to the wiper arm (not shown) is coupled to the coupling hole 32. The adaptor 70 is rotatably assembled to the central shaft 35. The wiper arm is assembled to the adaptor 70. In accordance with the shape of the adaptor 70, a variety of wiper arms including a side pin-hole type wiper arm, a U-hook type wiper arm or the like may be coupled to the adaptor 70.

As shown in FIG. 8, a fitting hole 36 to which the central shaft 35 is fitted and coupled is formed on the side of the main lever 30. Side pin coupling holes 37*a* and 37*b* to which the side pin-hole type wiper arm is coupled are formed on the side of the main lever 30. Meanwhile, the main lever 30 may be made of a metallic material. The central shaft 35 may be also made of a metallic rivet. When the main lever 30 is made of a metallic material, the rigidity of the wiper blade is increased while the weight of the main lever 30 is increased. In general, in the wiper blade 1, a relatively large moment is generated in the portion where the main lever 30 is connected to the wiper arm (not shown) and in the portion where the main lever 30 is connected to the first auxiliary lever 40. Therefore, when the main lever 30 is made of the metallic material, the increased rigidity of the wiper blade 1 prevents the wiper blade 1 from being damaged, so that the lifespan of the wiper blade 1 can be extended.

Both sides of the main lever 30 have the coupling portion 33 formed thereon so as to be coupled to the first auxiliary lever 40. The hinge recess 34 in which the hinge shaft 41 of the first auxiliary lever 40 is received is formed in the coupling portion 33. The hinge recess 34 has one open side allowing the hinge shaft 41 to be inserted thereinto.

Hereafter, the operation of the wiper blade 1 of the embodiment configured as described above will be described in detail through the description of an assembly method of the wiper blade 1.

Figure 9A:
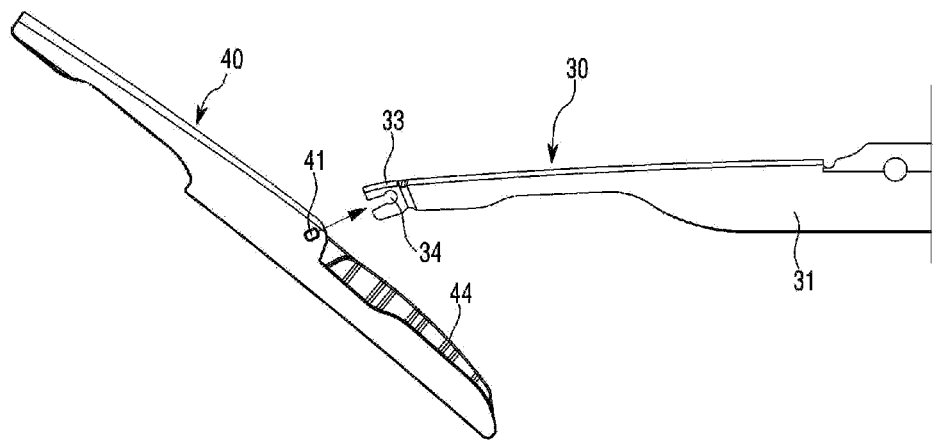
FIGS. 9a, 9b and 9c are front views how the main lever is coupled to the first auxiliary lever in accordance with the present invention.
Figure 9B:
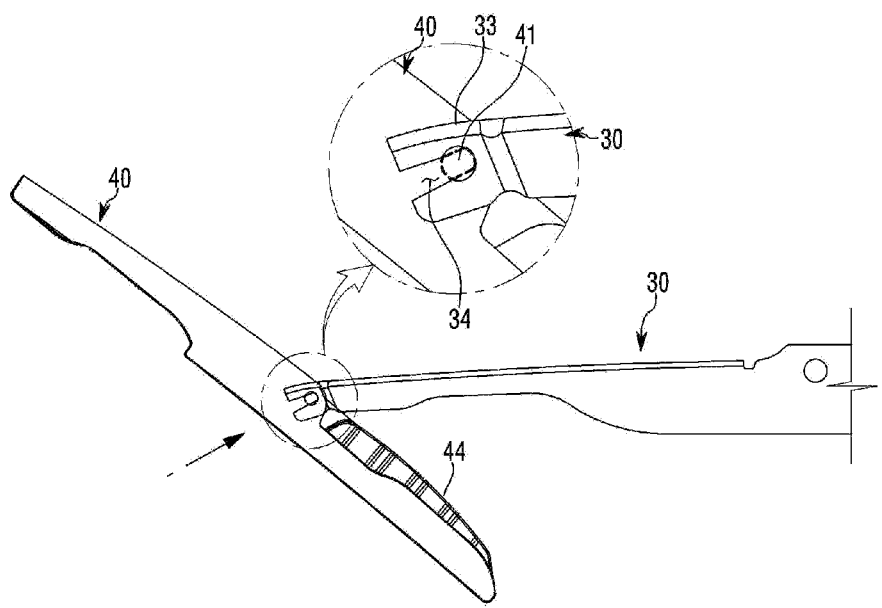
Figure 9C:
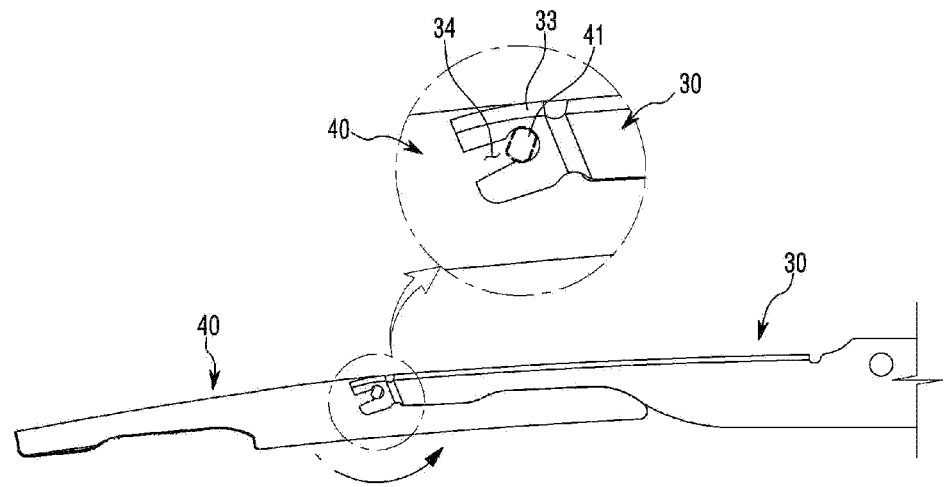

FIGS. 9*a* to 9*c* are front perspective plan views how the main lever is coupled to the first auxiliary lever of the wiper blade in accordance with the embodiment of the present invention.

The method of assembling the main lever 30 to the first auxiliary lever 40 will be described with reference to FIGS. 7*a* to 7*c* and 9*a* to 9*c*.

As shown in FIGS. 7*a* and 9*a*, the first auxiliary lever 40 rotates at an angle of approximately 45° with a rotation axis of the hinge shaft 41, or the main lever 30 rotates with a rotation axis of the hinge recess 34. That is, since the hinge shaft 41 has the non-circular cross section, as shown in FIGS. 7*a* and 9*a*, the main lever 30 and the first auxiliary lever 40 should be assembled in a particular direction. As shown in FIGS. 7*b* and 9*b*, after the main lever 30 or the first auxiliary lever 40 rotates, the hinge shaft 41 is inserted and fixed through the opening of the hinge recess 34. As such, after the hinge shaft 41 is fixed to the hinge recess 34, as shown in FIGS. 7*c* and 9*c*, the main lever 30 or the first auxiliary lever 40 rotates with a rotation axis of the hinge shaft 41 or the hinge recess 34, the main lever 30 and the first auxiliary lever 40 are coupled to and aligned with each other. An angle formed by the main lever 30 and the first auxiliary lever 40 when the wiper blade 1 wipes is significantly less than an angle formed when the two levers 30 and 40 are coupled to each other.

Accordingly, in the wiper blade 1 according to the embodiment of the present invention, the tapered cross section of the hinge shaft 41 is caught by the hinge recess 34, so that the hinge shaft 41 is prevented from being separated through the opening of the hinge recess 34. Also, the coupling portion between the levers is not visible from the outside, so that the appearance of the wiper blade 1 is improved. Further, an angle formed by the main lever 30 and the first auxiliary lever 40 when the wiper blade 1 wipes is significantly less than the above-mentioned angle formed when the two levers are coupled to each other. Therefore, it is possible to prevent the two levers from being separated from each other when the wiper blade 1 wipes. Accordingly, the reliability and rigidity of the lever are obtained without using the pin, rivet and spacer which have been used to couple the main lever 30 and the first auxiliary lever 40 in the past, and thus the weight of the wiper blade 1 and the number of the parts of the wiper blade 1 can be reduced. Consequently, the production cost and process time of the wiper blade can be reduced.

Figure 10:
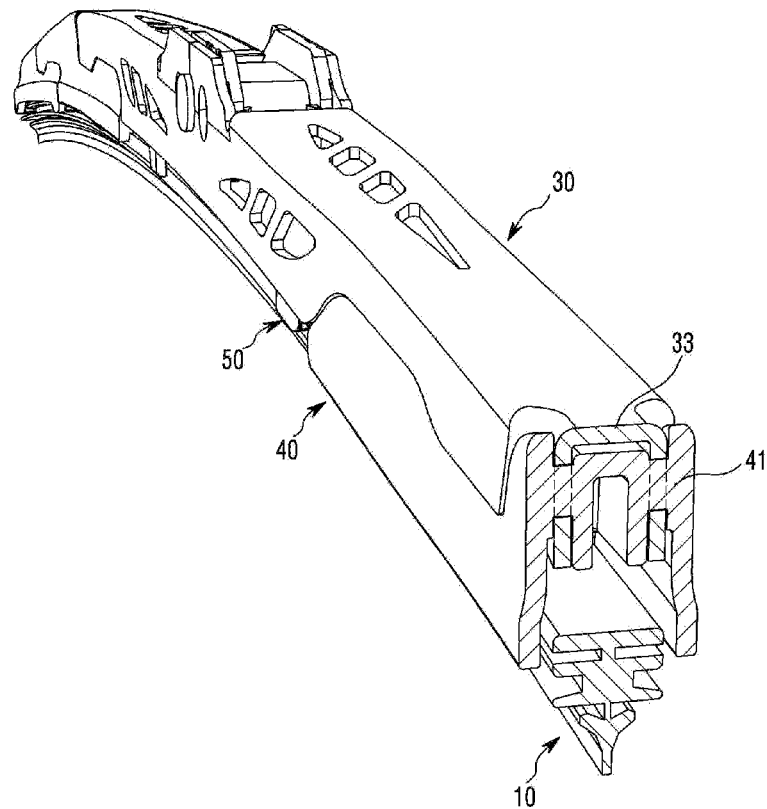
FIG. 10 is a sectional perspective view of FIG. 1 taken along line VA.

FIG. 10 is a sectional perspective view of FIG. 1 taken along line VA.

Referring to FIG. 10, the coupling portion 33 of the main lever 30 is coupled to the hinge shaft 41 of the first auxiliary lever 40. Here, the coupling portion 33 is inserted between the inner wall and the outer wall of the first auxiliary lever 40. Accordingly, the coupling portion to which a bending moment is applied when wiping is performed is doubly supported by the coupling portion 33 and the inner and the outer walls of the first auxiliary lever 40. Then, the rigidity and durability are improved. The coupling portion 33 of the main lever 30 comes in contact with four points of the inner and outer walls of the first auxiliary lever 40, so that a sliding area becomes larger. Accordingly, the gap at the time of wiping can be reduced. Also, the assembly portion is not visible from the outside, and thus, the appearance is improved.

In the meantime, a portion of the first auxiliary lever 40 is received in the lower portion of the main lever 30. The received portion of the first auxiliary lever 40 has the prominence and depression structure 44, thereby increasing the contact portion between the main lever 30 and the first auxiliary lever 40 when they are pivoted. As a result, the gap can be prevented from being larger.

Next, an order of assembling the first auxiliary lever 40, the yoke lever 50 and the second auxiliary lever 60 will be described with reference to FIGS. 4 and 5.

The yoke lever 50 and the second auxiliary lever 60 are rotatably coupled to the first auxiliary lever 40. That is, the first catching protrusion 42 of the first auxiliary lever 40 is elastically coupled to the catching recess 51 of the yoke lever 50. The second catching protrusion 43 is elastically coupled to the catching recess 61 of the second auxiliary lever 60. The central shaft 35 is assembled to the fitting hole 36 of the main lever 30, and the adaptor 70 is coupled to the central shaft 35, and thus the assembly of the wiper blade 1 is completed. The foregoing assembly method is provided for illustration, and the order of assembling the parts may be changed.

In the next place, a second embodiment of the present invention will be described.

Second Embodiment

Figure 11A:
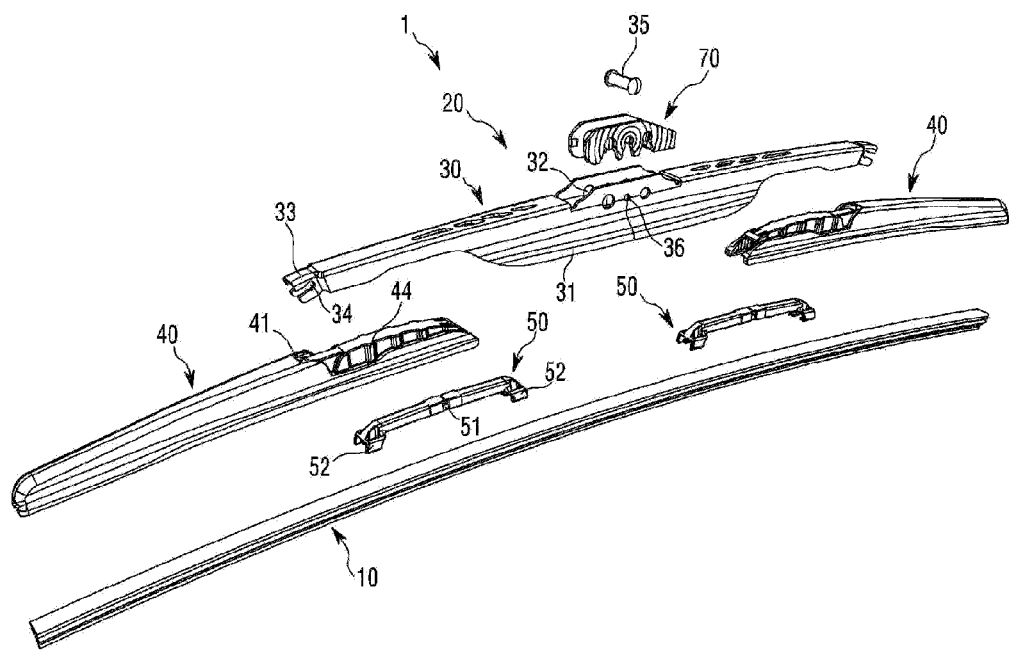
FIG. 11a is an exploded perspective view showing a wiper blade according to another embodiment of the present invention.
Figure 11B:
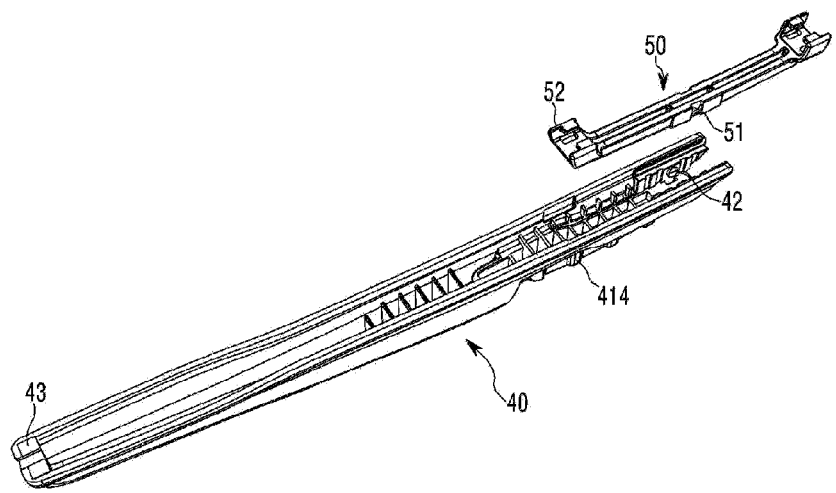
FIG. 11b is a bottom perspective view showing a first lever and a yoke lever of the wiper blade according to the another embodiment of the present invention.

FIGS. 11a and 11b are an exploded perspective view and a bottom perspective view respectively, which show a wiper blade 2 obtained by removing the second auxiliary lever 60 of the wiper blade 1 of the first embodiment shown in FIGS. 4 and 5.

A pair of the yoke levers 50 and a pair of the second auxiliary levers 60 support eight points of the wiper blade 1 according to the first embodiment of the present invention. However, according to the second embodiment of the present invention, when the length of the vehicle's glass surface is relatively short, the second auxiliary lever 60 may be removed.

Referring to FIGS. 11a and 11b, the wiper blade 2 according to the second embodiment of the present invention includes no second auxiliary lever 60. The second catching protrusion 43 of the first auxiliary lever 40 is formed to have a yoke shape, to thereby support the wiper strip 10 in such a manner as to be slidable. Accordingly, the wiper strip 10 is supported by a pair of the first auxiliary levers 40 and a pair of the yoke levers 50. That is, the wiper blade according to the second embodiment of the present invention has a six-point support structure in which a pair of the first auxiliary levers 40 supports four points and a pair of the yoke levers 50 supports both ends of the wiper strip 10.

The wiper blade 2 according to the second embodiment of the present invention can be applied to a glass surface of the vehicle, which has a small size and a relatively not large curvature. Through the omission of the second auxiliary lever 60, the number of the parts can be reduced and the process time and production cost of the wiper blade 2 can be reduced. Meanwhile, the length of the yoke lever 50 may be changed according to the curvature of the glass surface of the vehicle.

Next, a third embodiment of the present invention will be described.

Third Embodiment

Figure 12A:
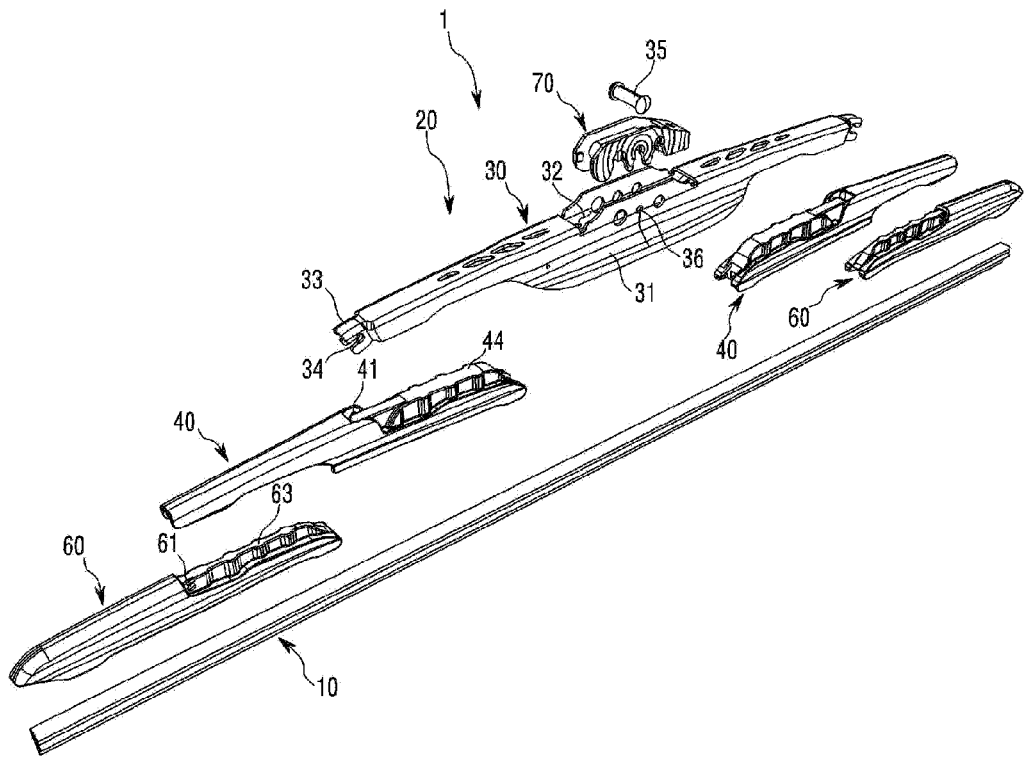
FIG. 12a is an exploded perspective view showing a wiper blade according to further another embodiment of the present invention.
Figure 12B:
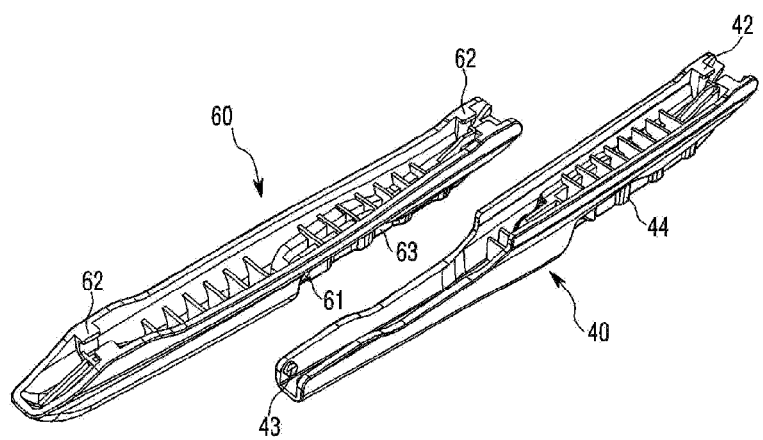
FIG. 12b is a bottom perspective view showing a first lever and a second lever of the wiper blade according to the further another embodiment of the present invention.

FIG. 12a is an exploded perspective view showing a wiper blade 3 obtained by removing the yoke lever 50 of the wiper blade 1 according to the first embodiment. FIG. 12b is a bottom perspective view showing a portion of the wiper blade 3.

Referring to FIGS. 12a and 12b, the wiper blade 3 according to the third embodiment of the present invention includes no yoke lever 50. The first catching protrusion 42 of the first auxiliary lever 40 is formed to have a yoke shape, to thereby support the wiper strip 10 in such a manner as to be slidable. Therefore, a pair of the first auxiliary lever 40 supports two points of the central portion of the wiper strip 10, and a pair of the second auxiliary lever 60 supports four points of the wiper strip 10. That is, the wiper strip 10 has a six-point support structure as a whole.

The wiper blade 3 according to the third embodiment more presses the front end of the wiper strip 10 than the wiper blade 2 according to the second embodiment does. Therefore, the wiper blade 3 can be applied to a vehicle's glass surface having a curvature larger than that of the vehicle's glass surface to which the wiper blade 2 of the second embodiment is applied.

The wiper blades 2 and 3 according to the second and third embodiments respectively remove any one of the yoke lever 50 and the second auxiliary lever 60, so that the process time and production cost can be reduced and a customized design can be performed according to the size and curvature of the glass surface.

Next, a wiper blade according to a fourth embodiment will be described.

Fourth Embodiment

Figure 13:
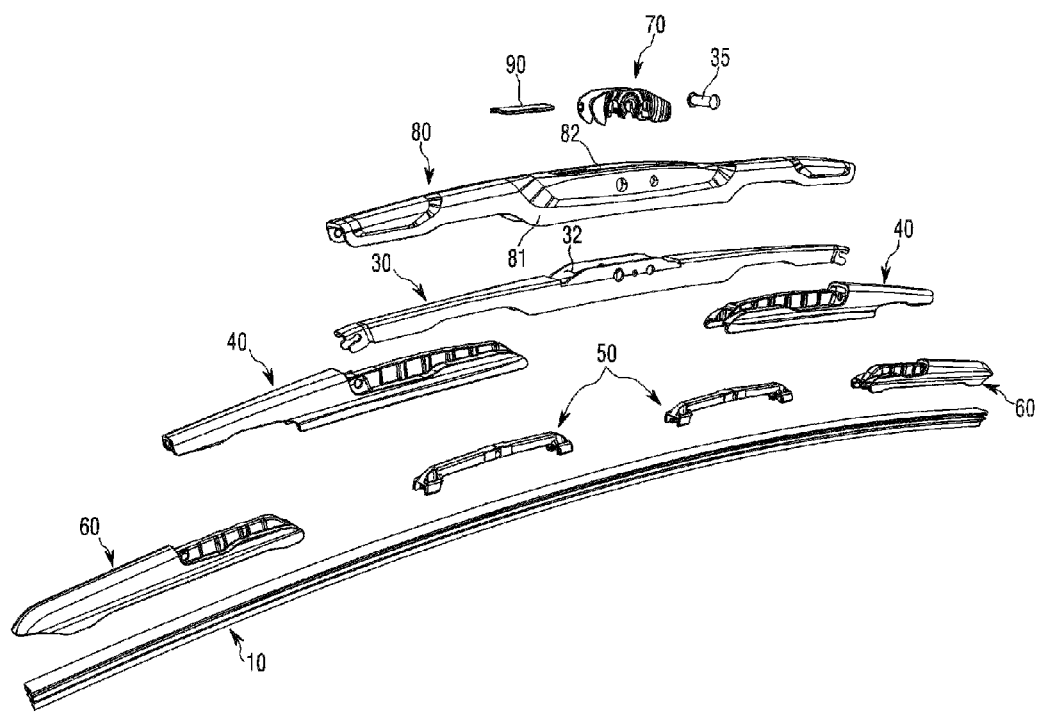
FIG. 13 is a perspective view showing a wiper blade according to yet another embodiment of the present invention.
Figure 14:
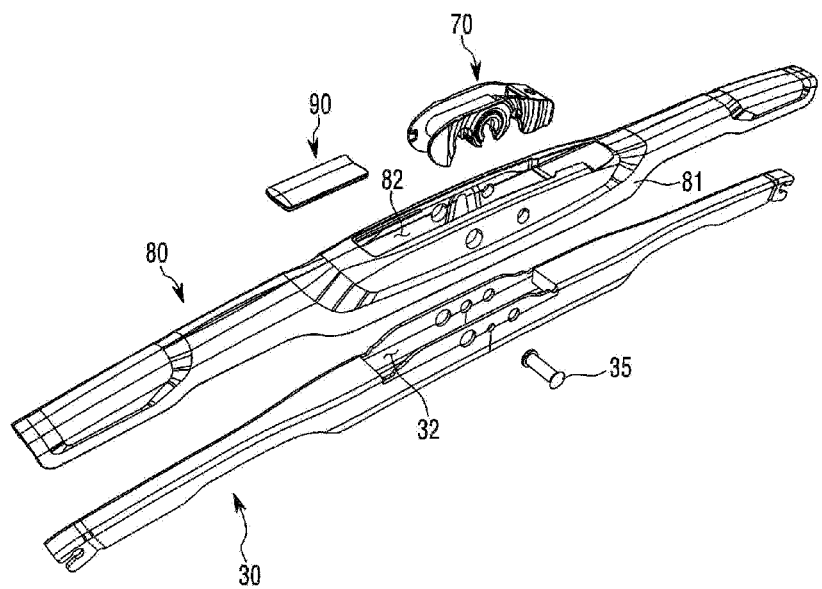
FIG. 14 is a perspective view showing a portion of a configuration of the wiper blade shown in FIG. 13.

FIG. 13 shows a wiper blade according to the fourth embodiment of the present invention. FIG. 14 shows the main lever, a cover, a cover unit, the adaptor and the central shaft of the wiper blade shown in FIG. 13.

Referring to FIGS. 13 and 14, the wiper blade according to the embodiment of the present invention further includes a cover 80 which covers the main lever of the wiper blade according to the first embodiment.

As shown in FIGS. 13 and 14, the cover 80 downwardly covers the top of the main lever 30. The lower inner side of the cover 80 is formed to be open to cover the main lever 30. An arm coupling receiving hole 82 is formed in the central portion of the cover 80. The coupling hole 32 of the main lever 30 and the adaptor 70 are located in the arm coupling receiving hole 82. Also, the wiper blade according to the fourth embodiment may further include the cover unit 90 connected to the arm coupling receiving hole 82.

The cover 80 may be made of a resin material. The main lever 30 of the wiper blade according to the fourth embodiment does not have to include a spoiler formed outwardly therefrom. A spoiler 81 may be formed outwardly from the cover 80 covering the main lever 30 from the outside. The cover 80 increases the thickness of the central portion of the wiper blade, to thereby increase the rigidity of the entire wiper blade. Also, the cover 80 improves the appearance by covering the metallic main lever 30, and prevents the main lever 30 from corroding or rusting by minimizing the external exposure of the metallic main lever 30. The cover unit 90 prevents the wiper blade and the wiper arm from being separated from each other and causes the connecting portion of the metallic main lever 30 or the wiper arm not to be visible from the outside, to thereby improve the appearance.

In summary, the wiper blade according to the embodiment is comprised of the levers made of a resin material as a whole, so that it has a reduced weight and the improved appearance. For the purpose of enhancing the rigidity, the main lever is made of a metallic material. Therefore, the time and cost required for manufacturing the wiper blade can be reduced. Also, it is possible to assemble through the shape of the lever without using the rivet and spacer, possible to reduce the number of the parts, and possible to improve assemblability. Through the coupling method of the levers and the prominence and depression structure, the rigidity and durability of the wiper blade are increased.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. That is, the components described in detail in the embodiments of the present invention may be modified. Further, differences due to the modification and application should be construed as being included in the scope and spirit of the present invention, which is described in the accompanying claims.

What is claimed is:

1. A wiper blade comprising:
a wiper strip which wipes a wiping surface; and
a lever unit which supports the wiper strip,
wherein the lever unit comprises:
a main lever which is connected to a wiper arm;
a pair of yoke levers which supports wiper strip; and
a pair of first auxiliary levers which is relatively rotatably coupled to the yoke levers respectively and is coupled to the main lever,
wherein both ends of the main lever comprise a coupling portion in which a hinge recess is formed,
wherein the first auxiliary lever comprises a hinge shaft which is inserted and fixed to the hinge recess,
wherein the hinge shaft has a tapered cross section in a longitudinal direction of the wiper blade,
wherein the first auxiliary lever comprises a pair of inner walls and a pair of outer walls,
wherein one of the pair of the inner walls and one of the pair of the outer walls are disposed on one side with respect to a center in a width direction of the wiper blade, and wherein the other of the pair of the inner walls and the other of the pair of the outer walls are disposed on the other side with respect to the center in the width direction of the wiper blade, and
wherein the coupling portion is inserted between the one of the pair of the inner walls and the one of the pair of the outer walls.

2. The wiper blade of claim 1, wherein a width of a front end of the hinge shaft, in a direction in which the hinge shaft is inserted into the hinge recess, is shorter than a width of an opening of the hinge recess.

3. The wiper blade of claim 1,
wherein the first auxiliary lever further comprises a first catching protrusion which is formed on one end thereof and is coupled to the yoke lever, and comprises a second catching protrusion which is formed on the other end thereof and supports the wiper strip,
and wherein the yoke lever comprises a catching recess by which the first catching protrusion is caught and which is concave in a width direction thereof, and comprises a pair of fasteners which supports the wiper strip.

4. The wiper blade of claim 1, wherein the first auxiliary lever and the yoke lever are made of a resin material.

5. The wiper blade of claim 1, wherein the lever unit further comprises a pair of second auxiliary levers which supports the wiper strip, forms an appearance of the lever unit and is relatively rotatably coupled to the pair of the first auxiliary levers respectively.

6. The wiper blade of claim 5,
wherein the first auxiliary lever comprises a first catching protrusion so as to be coupled to the yoke lever and comprises a second catching protrusion so as to be coupled to the second auxiliary lever,
wherein the yoke lever comprises a catching recess by which the first catching protrusion is caught and which is concave in a width direction thereof, and comprises a pair of fasteners which supports the wiper strip, and
wherein the second auxiliary lever comprises a catching recess by which the second catching protrusion is caught and which is concave in a width direction thereof, and comprises a pair of fasteners which supports the wiper strip.

7. The wiper blade of claim 5, wherein the second auxiliary lever further comprises a prominence and depression structure which is received in a lower inside of the first auxiliary lever and contacts with a lower surface of the first auxiliary lever.

8. The wiper blade of claim 5, wherein the first auxiliary lever, the yoke lever and the second auxiliary lever are made of a resin material.

9. The wiper blade of claim 1, wherein the yoke lever is received in lower insides of the first auxiliary lever and the main lever.

10. The wiper blade of claim 1, wherein, after the hinge shaft is inserted into the hinge recess, the main lever and the first auxiliary lever are coupled to each other by rotating about the hinge shaft.

11. The wiper blade of claim 1, wherein the first auxiliary lever further comprises a prominence and depression structure which is received in a lower inside of the main lever and contacts with a lower surface of the main lever.

12. The wiper blade of claim 1, wherein the main lever further comprises a spoiler which is integrally formed with a side thereof, toward which traveling wind flows, in such a manner as to be concave as a whole toward the wiper strip.

13. The wiper blade of claim 1, wherein the main lever has a coupling hole formed therein, to which the wiper arm is assembled, and further comprises an adaptor which is assembled to the coupling hole and is directly connected to the wiper arm.

14. The wiper blade of claim 13, further comprising a cover which covers the main lever and has an arm coupling receiving hole formed in a central portion thereof, wherein the cover is made of a resin material.

15. The wiper blade of 22, wherein the cover further comprises a spoiler which is integrally formed with a side thereof, toward which traveling wind flows, in such a manner as to be concave as a whole toward the wiper strip.

16. The wiper blade of claim 1, wherein the main lever is made of a metallic material.

* * * * *

UNITED STATES PATENT AND TRADEMARK OFFICE
CERTIFICATE OF CORRECTION

PATENT NO. : 9,714,006 B2
APPLICATION NO. : 14/060855
DATED : July 25, 2017
INVENTOR(S) : Kwan Hee Kim et al.

Page 1 of 1

It is certified that error appears in the above-identified patent and that said Letters Patent is hereby corrected as shown below:

In the Claims

Column 12, Line 58, Claim 15, replace "22" with --14--.

Signed and Sealed this
Seventeenth Day of March, 2020

Andrei Iancu
*Director of the United States Patent and Trademark Office*